WILLIAM H. LAWRENCE.
Improvement in Self-Extinguishing Safety-Cans for Combustible Materials.
No. 114,450.     Fig. 1.     Patented May 2, 1871.
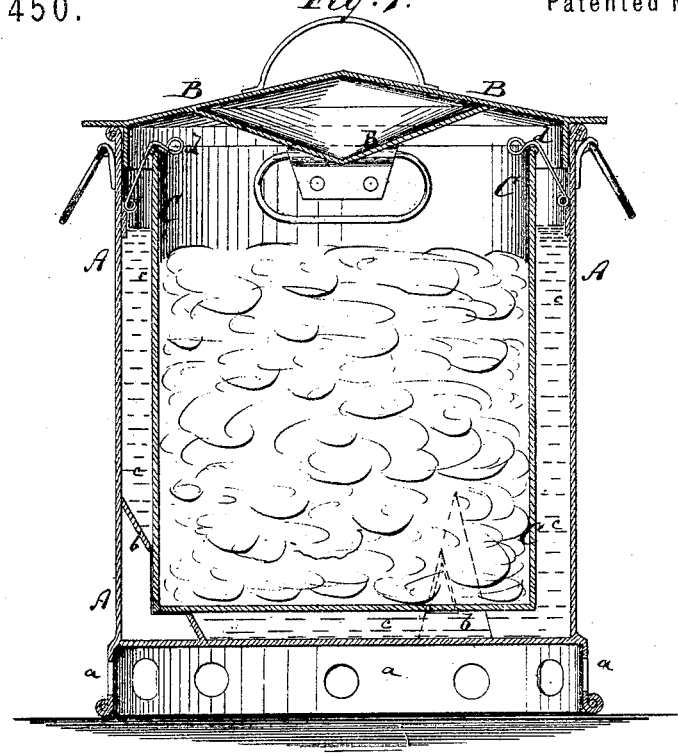
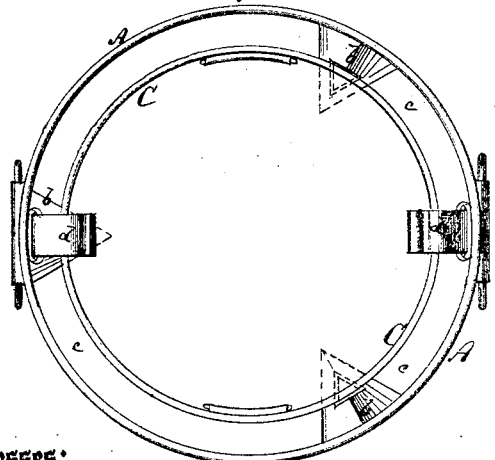
Fig. 2.
Witnesses:
C. Ruettig.
Wm H. C. Smith.
Inventor:
W. H. Lawrence.
PER
Attorneys.

United States Patent Office.

WILLIAM H. LAWRENCE, OF WILLIAMSBURG, NEW YORK.

Letters Patent No. 114,450, dated May 2, 1871.

IMPROVEMENT IN SELF-EXTINGUISHING SAFETY-CANS FOR COMBUSTIBLE MATERIALS.

The Schedule referred to in these Letters Patent and making part of the same.

*To all whom it may concern:*

Be it known that I, WILLIAM H. LAWRENCE, of Williamsburg, in the county of Kings and State of New York, have invented a new and improved Safety-Can for Combustible Matter; and I do hereby declare that the following is a full, clear, and exact description thereof, which will enable others skilled in the art to make and use the same, reference being had to the accompanying drawing forming part of this specification.

Figure 1 represents a vertical central section of my improved safety-can.

Figure 2 is a top view of the same without the cover.

Similar letters of reference indicate corresponding parts.

This invention has for its object to provide a safe receptacle for oil, oil rags, and other matter considered spontaneously combustible, so that if ignited the fire will at once be extinguished by the force of its own heat.

The invention consists in placing the receptacle of the combustible matter within an outer vessel which contains water, so that in case fire breaks out in the inner vessel steam will be created in the outer and conducted to the fire, which it extinguishes.

The cover of the outer vessel is conical so as to guide the ascending steam toward the center into the inner vessel.

Clasps for holding down the inner vessel and preventing it from floating on the water are applied to the outer vessel.

By this invention a convenient receptacle for all dangerous waste and greasy rags produced or used in shops and engine-rooms is provided, and all danger of ignition from their spontaneous combustion averted.

A in the drawing represents a sheet-metal vessel of cylindrical or other form and suitable size.

It has a perforated supporting-flange, *a*, or suitable standard, and can be closed by a cover or lid, B.

C is a sheet-metal can or vessel of suitable form and somewhat smaller and shorter than A. It is put within the vessel A and supported therein by suitable feet or projections *b*, so that a space, *c*, is left within A, around and under C.

*d d* are hinged clasps affixed to the inner side of A to lock over the edge of C and hold it down on its supports.

Combustible matter is put within the can C and water into the space *c* surrounding the can. The cover is then closed.

The can C does not reach up to the cover, and is therefore open to the steam which is created by the heat of the fire in case matter within C should be ignited; the steam entering the vessel will immediately extinguish the fire.

I prefer to make the under side of the cover of conical form, as shown—that is to say, make it deeper in the middle, so that it will properly guide the steam to the fire.

Having thus described my invention,

I claim as new and desire to secure by Letters Patent—

1. The safety-can C placed into the closed water vessel A in such manner that the heat of any fire within C will create steam to extinguish the fire, as set forth.

2. The hinged clasps *d d*, applied to the outer vessel A to hold down the can C and prevent it from floating, as specified.

3. The cover B of the vessel A, made conical on the under side, as specified.

WILLIAM H. LAWRENCE.

Witnesses:
 GEO. W. MABEE,
 ALEX. F. ROBERTS.